Dec. 7, 1926.

W. C. TESCH

SAW FILER

Filed Nov. 24, 1924

Inventor!
Walter C. Tesch

Dec. 7, 1926.  1,610,178
W. C. TESCH
SAW FILER
Filed Nov. 24, 1924   2 Sheets-Sheet 2
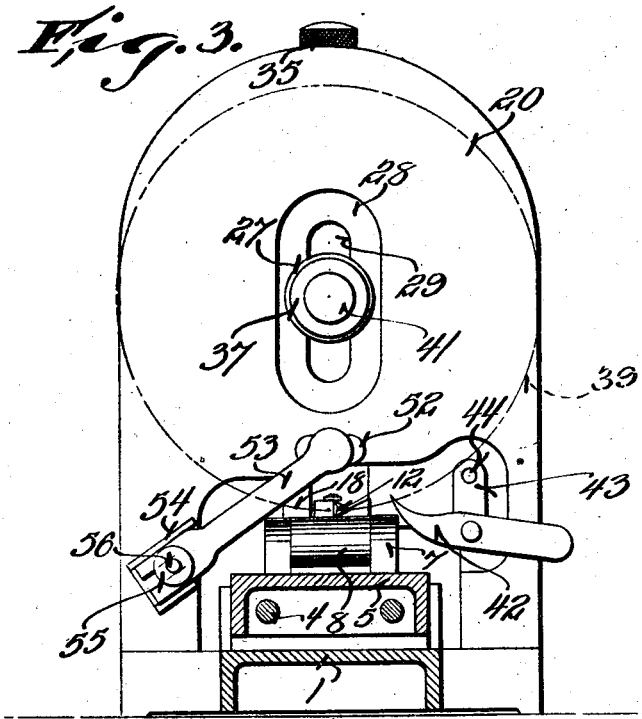
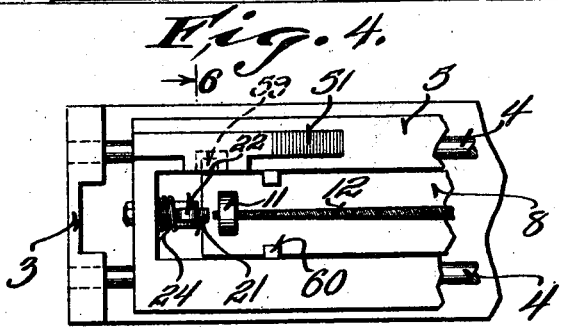
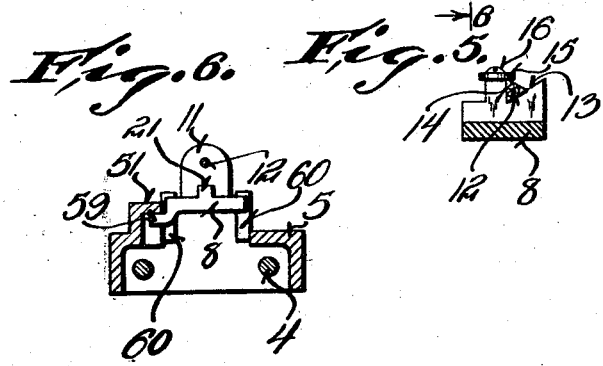
Inventor
Walter C. Tesch
By
Attorneys Patented Dec. 7, 1926.

1,610,178

UNITED STATES PATENT OFFICE.

WALTER C. TESCH, OF MILWAUKEE, WISCONSIN.

SAW FILER.

Application filed November 24, 1924. Serial No. 751,974.

This invention relates to saw filers.

In filing saws, particularly circular saws, it has been found difficult to secure the exact angular relation between the cutting faces of the teeth which is so much to be desired in this type of saw. Further than this, the depth of cut of the file has been an uncertain quantity and uniform sharpening has heretofore been impossible.

This invention is designed to overcome the above noted defects, and objects of such invention are to provide a saw filer which is adapted to receive any one of a plurality of different sized circular saws, which will secure the correct relative angular setting of each of the cutting faces of the saw, which will insure a uniform sharpening of all of the saw teeth, and which will not permit the retraction of the file while in contact with the saw.

Further objects are to provide a saw filer which may be rapidly operated without requiring any skill on the part of the operator, which will automatically feed the saw a tooth at a time, which will exert the same pressure on each of the teeth while they are being filed, and which will insure the utmost regularity in the sharpening of successive teeth.

An embodiment of the invention is shown in the accompanying drawings, in which:—

Figure 3 is a corresponding view on the line 3—3 of Figure 1.

Figure 4 is a fragmentary plan view of the file carriage.

Figure 5 is a detail of the file holding means.

Figure 6 is a sectional view on the line 6—6 of Figure 4.

Figure 1:
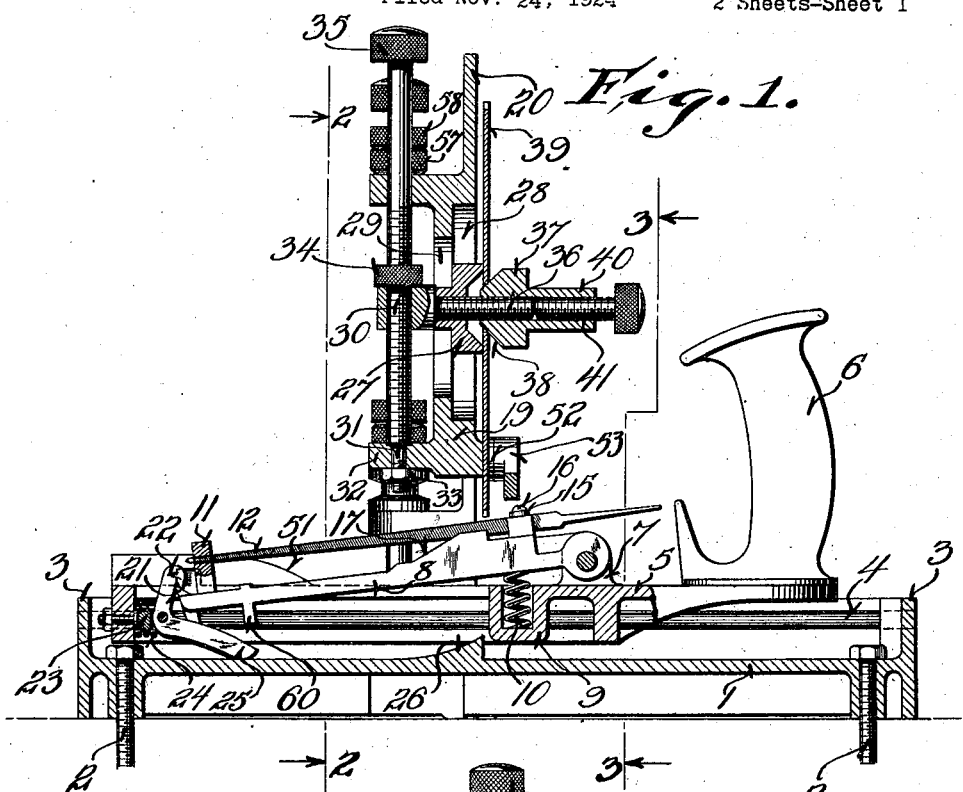
Figure 1 is a vertical sectional view through the device.

Referring more in detail to the drawing, it will be seen that the device comprises a main body portion 1 which is adapted to be secured to a table top by means of bolts 2, and which is provided with upstanding ends 3. A pair of guide rods 4 extend in parallel relation between the end members 3.

A roughly rectangular file carriage 5 is apertured to receive the rods 4 and is thus slidably carried upon the rods and adapted to be reciprocated by means of a hand grip or handle 6. This file carriage is provided with upstanding lugs 7 between which one end of a file plate 8 is pivoted. The carriage 5 is provided with a recess 9 which houses a compression spring 10, the upper end of such spring bearing against the file plate 8 and urging such plate upwardly. This file plate is provided with an apertured lug 11 at its outer end adapted to receive a triangular file 12. The inner end of the file 12 is received between a slanting face 13 (see Figure 5) and a vertical face 14 formed on lugs integral with the file plate 8. The file is retained in position by means of a washer 15 held downwardly by means of a screw 16, as clearly shown in Figure 5.

Figure 2:
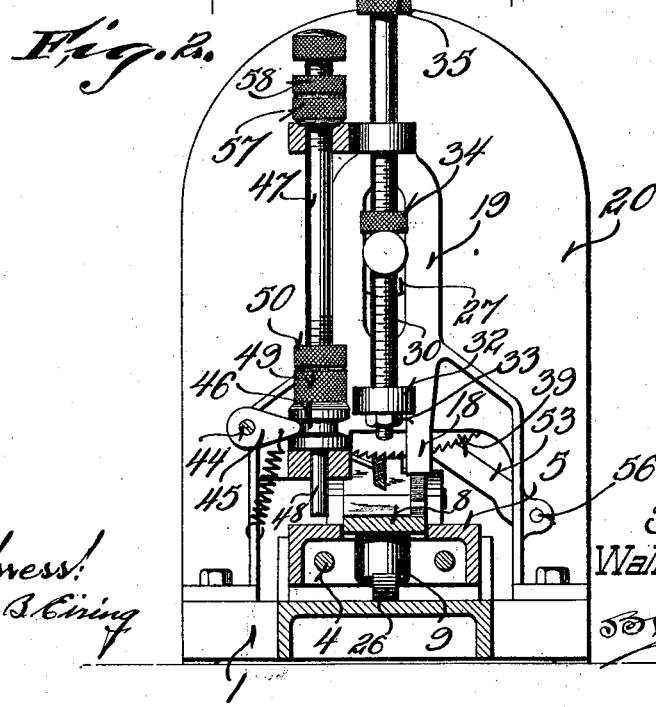
Figure 2 is a transverse sectional view on the line 2—2 of Figure 1.

Means are provided for rocking the file plate downwardly at the completion of a working stroke and for retaining such file plate in its lowermost position during the return stroke. This means may comprise a cam 17 formed on a portion of the file plate 8, as shown in Figure 1. This cam is adapted to contact with a lug 18 extending downwardly from the thickened portion 19 of a transverse frame 20 bolted to the base or body portion 1 of the apparatus, as shown in Figure 2. Thus when the file carriage 5 is rocked forwardly on its working stroke, the lug 18 rides upon the cam 17 and depresses the file plate 8 into position, as shown in Figure 1. This file plate is provided with a lip 21 which is engaged by a spring pressed detent 22, such detent being pivotally carried by a member 23 bolted to one end of the file carriage 5, as shown in Figure 1. This detent is spring pressed into latching position by means of the spring 24. It is provided with a downwardly extending arm 25 which normally slides along the smooth portion of the base 1. At the completion of the retraction stroke the arm 25 rides upwardly on the cam 26 formed in the base 1 (see Figure 1) and thus releases the outer end of the file plate 8 allowing such plate to spring upwardly under the influence of the spring 10 and thus positioning the file correctly for the working stroke.

A small crosshead 27 is guided in a slot 28 formed in the thickened portion 19 of the upright frame, as shown in Figure 1, and has a reduced portion projecting through a slot 29 in the portion 19. This reduced portion is apertured and is screw threaded and receives the adjusting screw 30, such adjusting screw being held against longitudinal motion by means of a reduced lower end 31 which fits within a lower lug 32 formed integral with the portion 19. This reduced portion 31 is threaded and receives a retaining nut 33, as clearly shown in Figure 1. A lock nut 34 is provided for binding against the extension of the crosshead 27 when it has been adjusted, and a knurled upper thumb nut 35 is formed on the screw 30 to facilitate its adjustment.

The crosshead 27 is provided with a threaded aperture which receives a threaded pin 36, such threaded pin carrying a mandrel or nut 37 provided with a conical portion 38 adapted to enter the central aperture in a circular saw, such as indicated at 39 in Figure 1, and to thus center such saw. This mandrel or nut 37 is provided with a reduced portion 40 which is also apertured and screw threaded to receive the locking screw 41.

Certain types of circular saws are provided with hubs and when one of this type is encountered, the mandrel is removed from the screw 36 and is reversed, the reduced portion 40 fitting within such hub.

In order to automatically feed the saw 39, a pawl 42 is provided, as shown in Figure 3, and is provided with a pointed end adapted to engage the teeth of the saw. This pawl is overbalanced by a relatively large projecting free end, as shown in Figure 3, and is carried by the outer end of a rock arm 43 which latter is rigidly mounted on a short shaft 44. The inner end of the shaft 44 (see Figure 2) is provided with an arm 45 which fits within a slot 46 of a collar carried by a reciprocatory pin 47, such pin being guided within suitable lugs carried by the member 19, as shown in Figure 2. The pin 47 has an extension 48 which projects through the collar 46, as shown in Figure 2. Any suitable means may be provided for regulating the extent of projection of the portion 48. For instance, a knurled nut 49 may be screw threaded upon the pin 47 and integral with the collar 46, and may be locked in place by a lock nut 50 to thus govern the projecting of the portion 48. If desired an additional nut 57 (see Figure 2) may be provided upon the stem 47 and may be held in place by lock nut 58. These nuts cooperate with the nuts 49 and 50 to adjust the stroke of the pin or stem 47.

This portion 48 is adapted to be struck by the slanting cam surface 51 of the file carriage 5 (see Figures 1 and 4) when such file carriage is completing its retracting stroke. Thus when the file carriage is retracted, the projection 48 is raised and rocks the shaft 44, and consequently moves the pawl 42 forwardly a distance of one tooth, thus advancing the saw.

In order to prevent the saw from moving beyond the desired position, a frictional shoe 52 (see Figure 3) is provided and is carried by an arm 53, such arm being held against a shouldered portion 54 of the transverse frame. The tension of the shoe is governed by a nut 55 screwed upon a projecting pin 56, as shown in Figure 3.

As may be seen from Figure 6, means are provided for limiting the upward stroke of the file plate 8. This means may comprise a lug 59 which fits within a recess provided below the member 51, as clearly shown in Figure 6, and thus limits the upward motion of the file plate. Means are also provided for preventing lateral swing of the file plate at its free end. This means may comprise a pair of guides 60, as shown in Figure 6, which are integral with the file plate 8 and slide between side portions of the file carriage 5.

It will thus be seen that a saw filer has been provided which will insure the correct angular relation of the cutting faces of the saw teeth, which will exert the same pressure upon the file at each stroke, which will withdraw the file from the work during retraction, and which may be rapidly operated by an unskilled person and will accurately produce the desired results.

Although the invention has been described in considerable detail, it is to be understood that the invention may be variously embodied and is, therefore, to be limited only as claimed.

I claim:

1. A filer for circular saws comprising a base having guides thereon, a transverse saw supporting frame carried by said base and adapted to receive a circular saw, a file carriage slidably mounted upon said guides, a file plate pivoted to said carriage and yieldingly urged upwardly, cam means for depressing said file plate at the completion of the work stroke, a latch for locking said plate in depressed position, and means for tripping said latch at the completion of the retraction stroke.

2. A filer for circular saws comprising a base having guides thereon, a transverse saw supporting frame carried by said base and adapted to receive a circular saw, a file carriage slidably mounted upon said guides, a file plate pivoted to said carriage and yieldingly urged upwardly, cam means for depressing said file plate at the completion of the work stroke, a latch for locking said plate in depressed position, means for tripping said latch at the completion of the retraction stroke, and means for advancing said saw one tooth at a time after each cycle of operations of said carriage.

3. A filer for circular saws comprising a base having guides thereon, a transverse saw supporting a frame carried by the base and adapted to receive a circular saw, a file carriage slidably mounted upon said guides, a file plate pivoted at one end to said file carriage and having its other end yieldingly urged upwardly, a stationary member carried by said transverse frame, a cam member carried by said file plate and contacting with said stationary member during the last portion of the working structure of said file to depress said file plate, a latch for temporarily locking the file plate in depressed position, and means for tripping said latch at the completion of the return stroke.

In testimony that I claim the foregoing I have hereunto set my hand at Milwaukee, in the county of Milwaukee and State of Wisconsin.

WALTER C. TESCH.